(12) United States Patent
Ribeiro et al.

(10) Patent No.: US 12,406,300 B2
(45) Date of Patent: Sep. 2, 2025

(54) BLOCKCHAIN-BASED TRANSACTION

(71) Applicant: Uphold, Inc., New York, NY (US)

(72) Inventors: Tiago Ribeiro, New York, NY (US);
Sameer Ismail, New York, NY (US);
Cem Miralay, New York, NY (US)

(73) Assignee: Uphold, Inc., New York, NY (US)

( * ) Notice: Subject to any disclaimer, the term of this patent is extended or adjusted under 35 U.S.C. 154(b) by 0 days.

(21) Appl. No.: 17/505,569

(22) Filed: Oct. 19, 2021

(65) Prior Publication Data

US 2022/0122177 A1    Apr. 21, 2022

Related U.S. Application Data

(60) Provisional application No. 63/093,597, filed on Oct. 19, 2020.

(51) Int. Cl.
*G06Q 40/04*        (2012.01)
*G06Q 20/10*        (2012.01)
(Continued)

(52) U.S. Cl.
CPC ......... *G06Q 40/04* (2013.01); *G06Q 20/1085* (2013.01); *G06Q 20/381* (2013.01); *H04L 9/3213* (2013.01); *G06Q 2220/00* (2013.01)

(58) Field of Classification Search
CPC .. G06Q 40/04; G06Q 20/1085; G06Q 20/381; G06Q 2220/00; H04L 9/3213
(Continued)

(56) References Cited

U.S. PATENT DOCUMENTS

2016/0019537 A1* 1/2016 Raja ............... G07F 19/203
                                                     705/43
2018/0293576 A1* 10/2018 Song .................. G06Q 20/223
(Continued)

FOREIGN PATENT DOCUMENTS

EP    2 797 058 A1    10/2014
WO    WO-2018/189597 A1    10/2018
WO    WO-2019/246627 A1    12/2019

OTHER PUBLICATIONS

Extended European Search Report for EP 21203564.6 dated Mar. 4, 2022 (10 pages).
(Continued)

*Primary Examiner* — Ambreen A. Alladin
(74) *Attorney, Agent, or Firm* — Foley & Lardner LLP

(57) ABSTRACT

Disclosed herein are methods and systems to facilitate a blockchain-backed peer-to-peer transaction without requiring the recipient's personally identifiable information and without updating the recipient's blockchain. A central server may receive a transaction request from a sender and may identify a system blockchain associated with the sender. When the server determines that the sender's accounts can satisfy the request, the server generates a unique transaction token. The server then transmits the unique transaction token to the sender, recipient (if indicated within the sender's request), and one or more electronic terminals. When the server receives an indication that the recipient has inputted the unique transaction token to the electronic terminal, the server appends a block instance corresponding to the transaction to the system blockchain.

14 Claims, 10 Drawing Sheets

(51) Int. Cl.
*G06Q 20/38* (2012.01)
*H04L 9/32* (2006.01)

(58) Field of Classification Search
USPC .......................................................... 705/35
See application file for complete search history.

(56) References Cited

U.S. PATENT DOCUMENTS

| | | | |
|---|---|---|---|
| 2019/0139033 A1* | 5/2019 | Ricotta | G06Q 20/1085 |
| 2019/0236561 A1 | 8/2019 | Hamilton et al. | |
| 2019/0236571 A1 | 8/2019 | Arora et al. | |
| 2019/0333048 A1* | 10/2019 | DiCross | G06Q 50/01 |
| 2020/0074419 A1* | 3/2020 | Govender | G06Q 20/367 |
| 2020/0118119 A1 | 4/2020 | Pence et al. | |

OTHER PUBLICATIONS

Anonymous: "Blockchain—Wikipedia", Feb. 28, 2020 (Feb. 28, 2020), XP055735976, Retrieved from the Internet: URL:https://en.wikipedia.org/w/index.php?title=Blockchain&oldid=943116926#Smart_contracts [retrieved on Oct. 1, 2020].
Examination Report for EPO Appl. 21203564.6 dated Feb. 8, 2024 (9 pages).

* cited by examiner

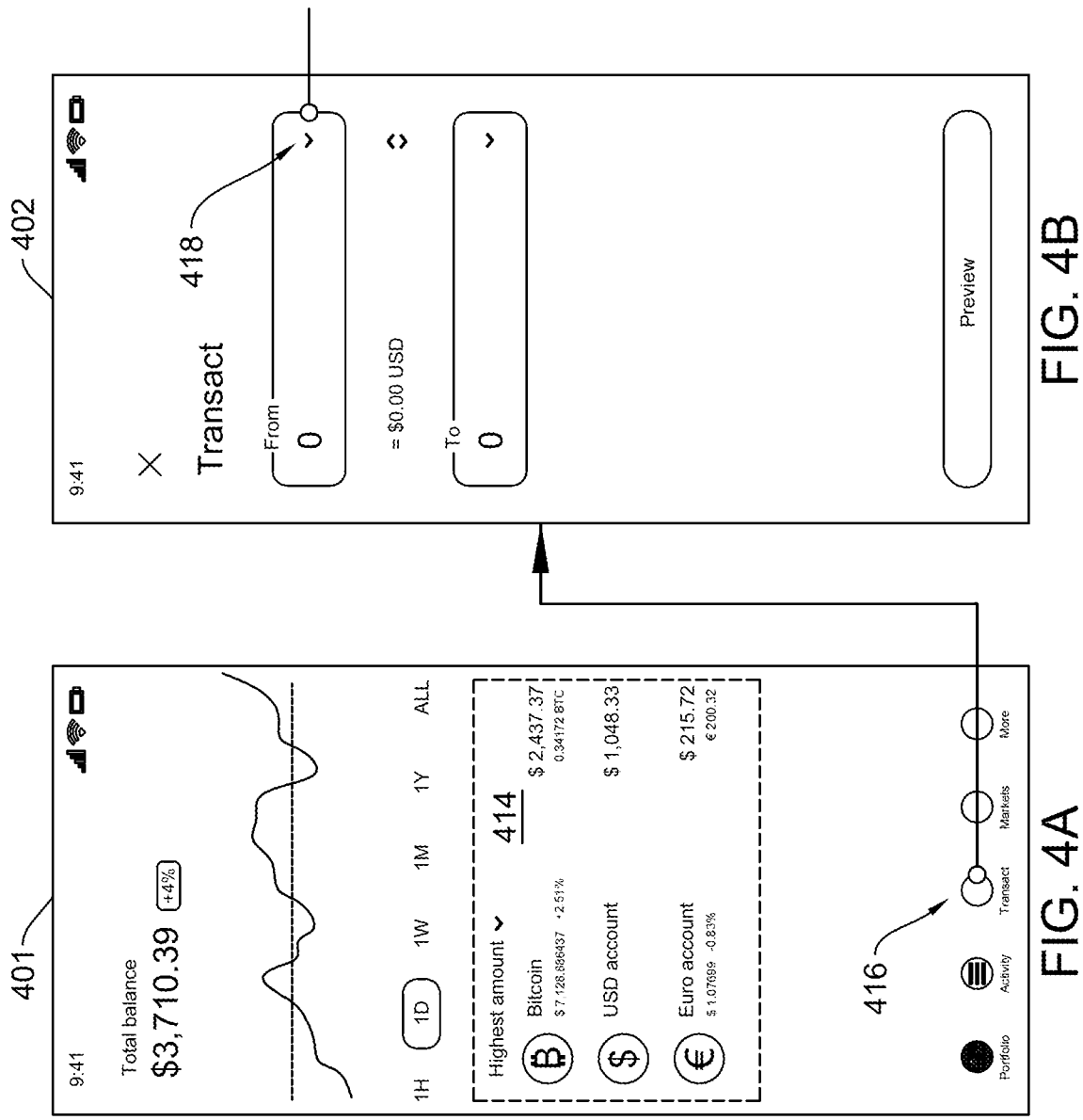

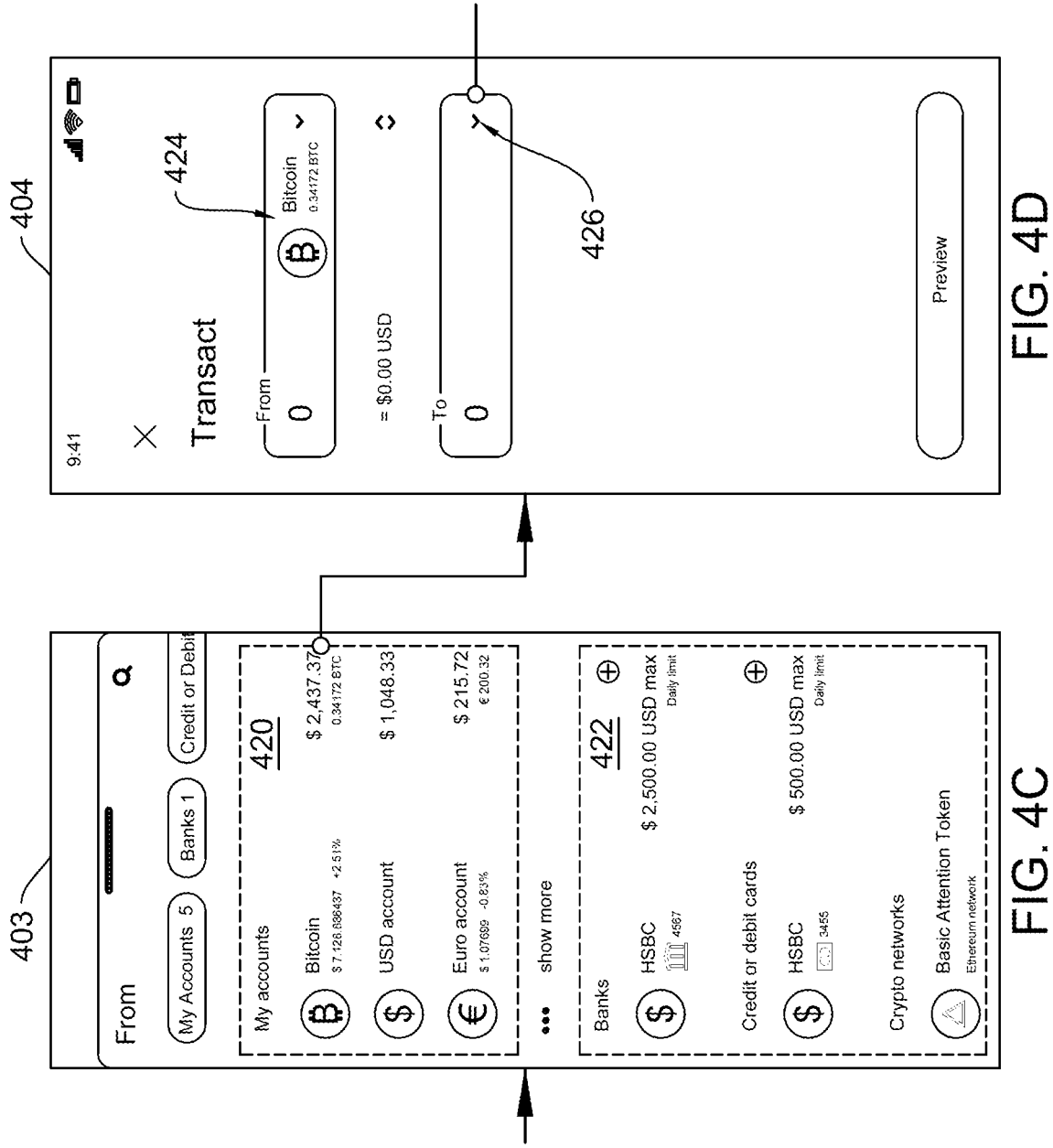

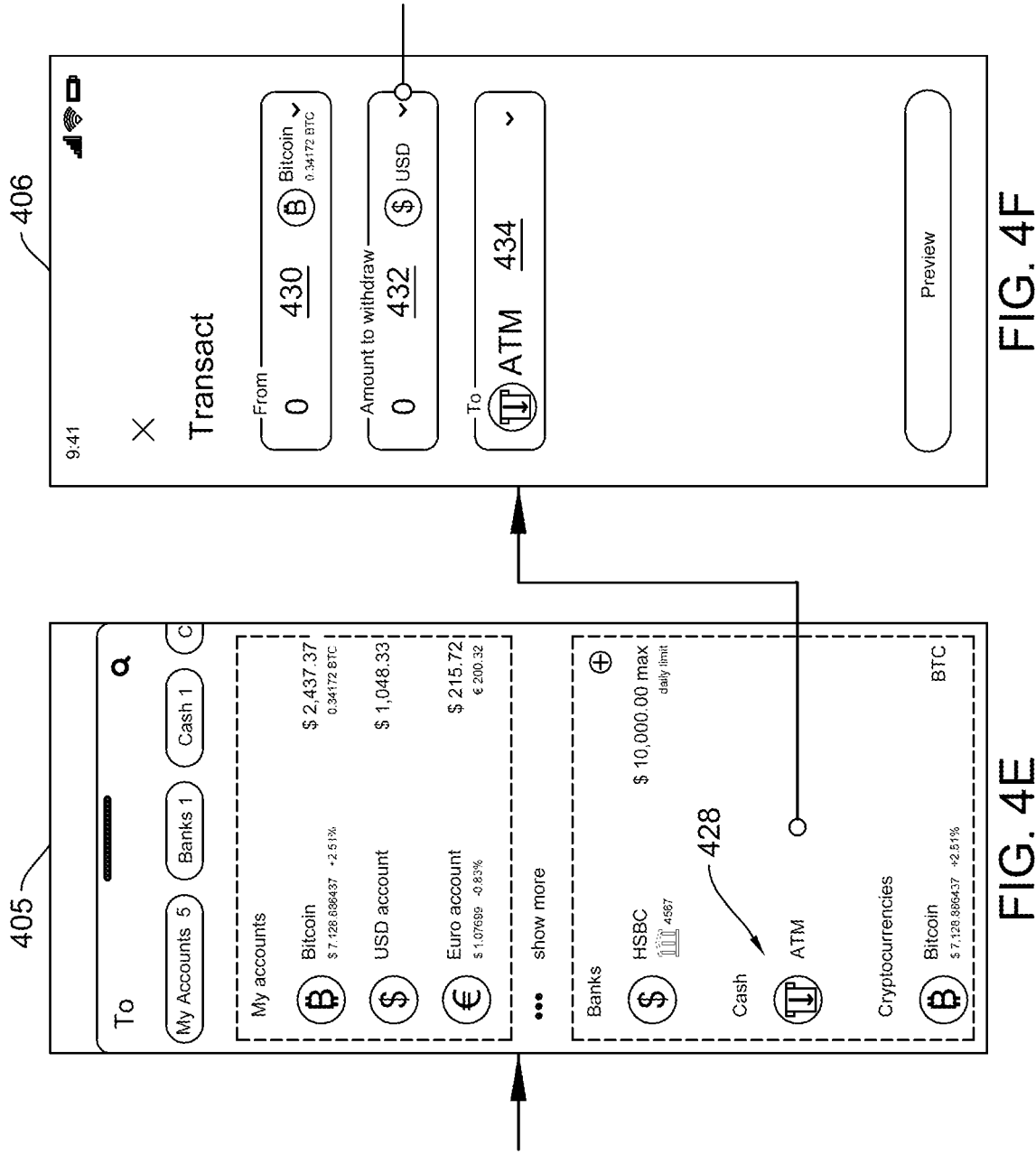

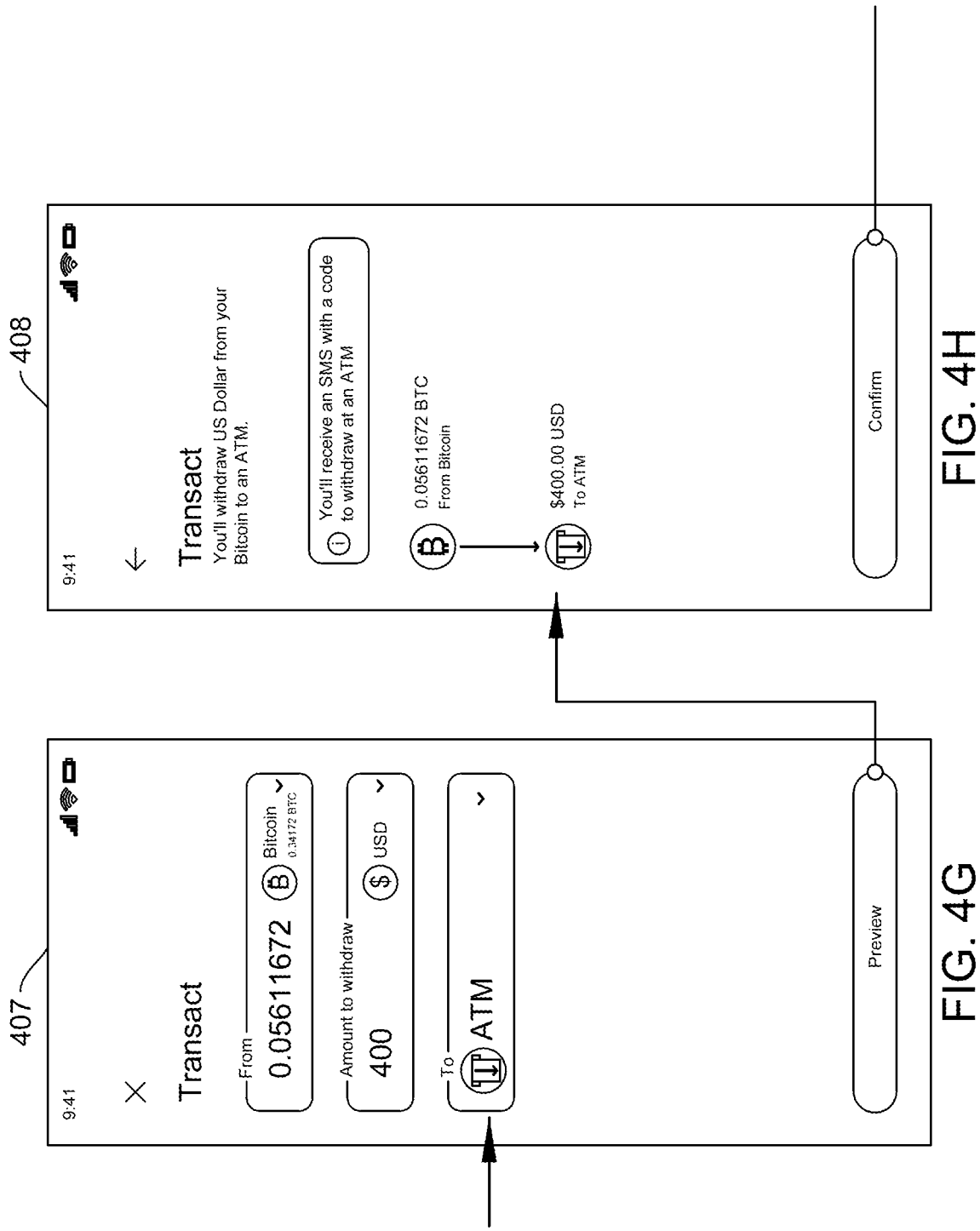

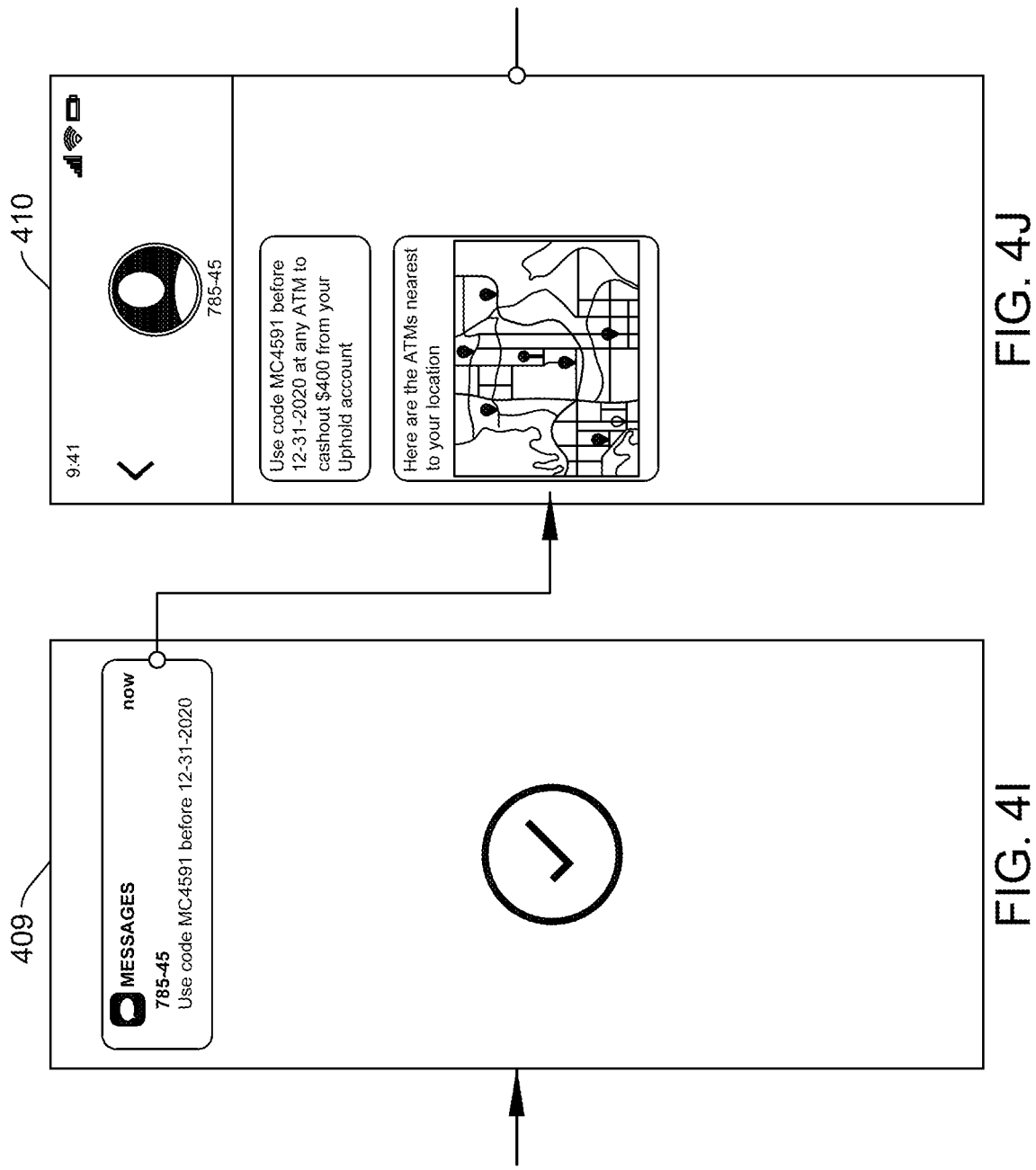

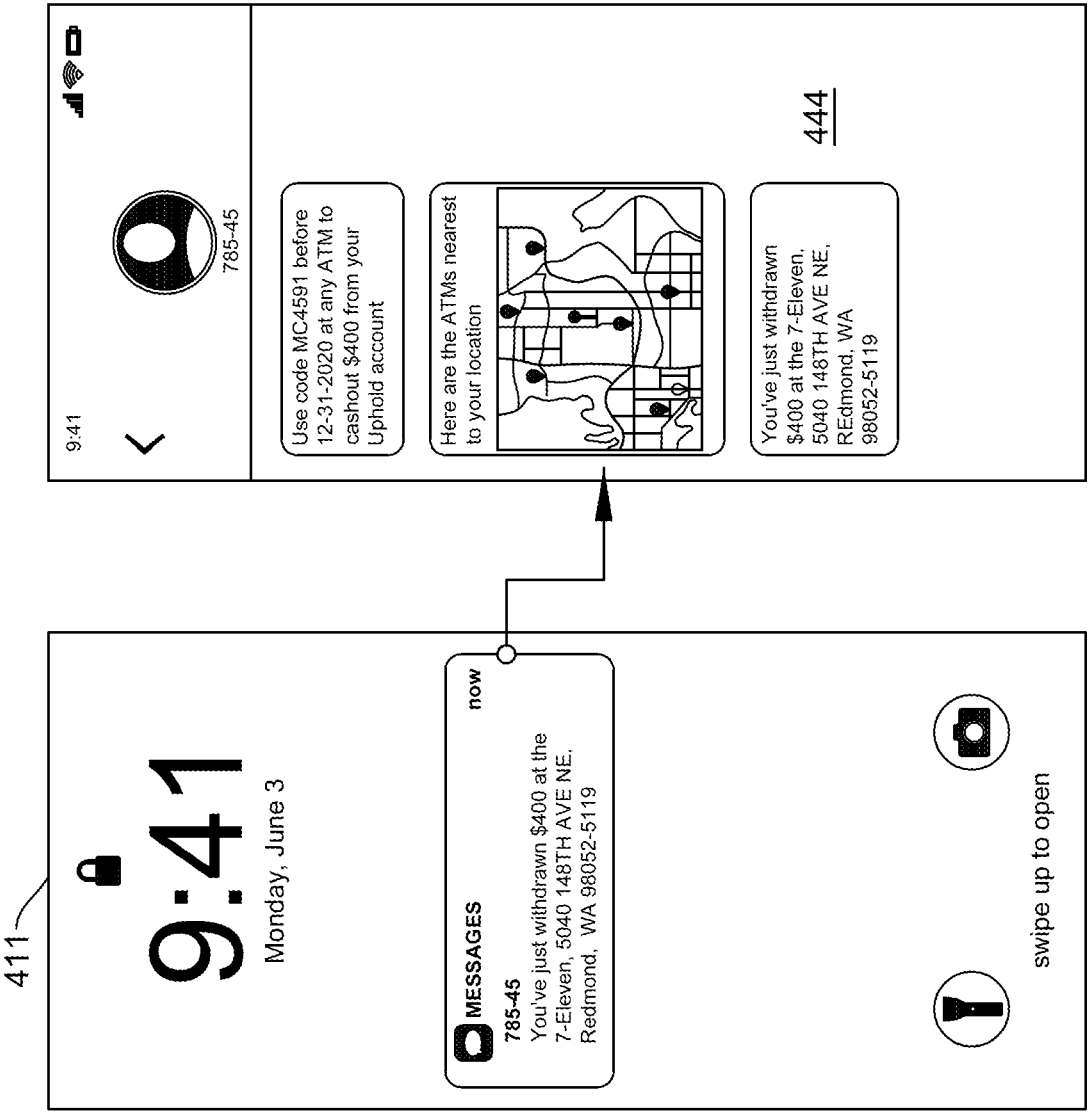

BLOCKCHAIN-BASED TRANSACTION

This application claims priority to U.S. Provisional Application No. 63/093,597, filed Oct. 19, 2020, which is incorporated herein by reference in its entirety for all purposes.

TECHNICAL FIELD

This application relates generally to conducting peer-to-peer payments using blockchain-based technology.

BACKGROUND

As more entities utilize distributed networks to track virtual currency (e.g., blockchain-backed currency) transactions, electronic payment methods using virtual currency have become more ubiquitous. An example of using electronic payment methods is peer-to-peer payments using payment applications and/or payment platforms. Conventional blockchain-based payment platforms allow users to transfer money to other users, but face a technical shortcoming. When conventional payment platforms use blockchain (or other distributed network) technology, those payment platforms typically require the recipient to register for an account or provide personally identifiable information to the payment platform to complete the transaction. Conventional payment platforms may utilize user information to identify a blockchain associated with the recipient and to append data to the recipient's blockchain that reflects the transaction. This requirement creates a less than ideal user experience and is computationally intensive. For instance, many users do not wish to provide their personally identifiable information to the sender's payment platform. Furthermore, adding data to the sender's blockchain is a time-consuming process that may also require high computing power.

SUMMARY

For the aforementioned reasons, there is a desire for a software solution (method and system) to address the above-described challenges. There is a desire for a software solution in form of electronic payment methods/systems to allow blockchain-backed transactions without requiring the recipient's information and without updating the recipient's blockchain. Using the methods and systems described herein, a first user (sender) may debit his/her virtual currency account and liquidate said account without providing any recipient information. The methods and systems described herein allow a central server (referred to herein as the analytics server) to debit a user's account and cause/instruct an electronic terminal (e.g., automated teller machine) to dispense the requested amount.

In one embodiment, a method comprises receiving, by an analytics server from a first electronic device operated by a first user, a request to transfer an amount of cryptocurrency to a second user, the request comprising an identifier of a second electronic device associated with the second user; retrieving, by the server, a blockchain having a set of nodes and a set of block instances, each block instance within the set of block instances corresponding to at least one user within a set of users including the first user, wherein the analytics server is a node within the set of nodes, wherein at least one block instance within the set of block instances comprises information associated with the first user's account and no block instance within the set of block instances comprises account information of the second user; upon at least one block instance within the set of block instances indicating that the first user's account has a cryptocurrency balance that satisfies the request: transmitting, by the analytics server to the second electronic device, a unique token and an identification of an electronic terminal; and transmitting, by the analytics server, the unique token to a terminal server, whereby when the terminal server receives an input of the unique token at the electronic terminal, the terminal server causes the electronic terminal to dispense the amount of cryptocurrency in fiat currency; upon receiving an indication that the electronic terminal has dispensed the amount generating, by the analytics server, a new block instance of the blockchain corresponding to debiting the amount of cryptocurrency from the first user's account.

In another embodiment, a system comprises server comprising a processor and a non-transitory computer-readable medium containing instructions that when executed by the processor causes the processor to perform operations comprises receive, from a first electronic device operated by a first user, a request to transfer an amount of cryptocurrency to a second user, the request comprising an identifier of a second electronic device associated with the second user; retrieve a blockchain having a set of nodes and a set of block instances, each block instance within the set of block instances corresponding to at least one user within a set of users including the first user, wherein the analytics server is a node within the set of nodes, wherein at least one block instance within the set of block instances comprises information associated with the first user's account and no block instance within the set of block instances comprises account information of the second user; upon at least one block instance within the set of block instances indicating that the first user's account has a cryptocurrency balance that satisfies the request transmit, to the second electronic device, a unique token and an identification of an electronic terminal; and transmit the unique token to a terminal server, whereby when the terminal server receives an input of the unique token at the electronic terminal, the terminal server causes the electronic terminal to dispense the amount of cryptocurrency in fiat currency; upon receiving an indication that the electronic terminal has dispensed the amount: generate a new block instance of the blockchain corresponding to debiting the amount of cryptocurrency from the first user's account.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings constitute a part of this specification, illustrate an embodiment of the disclosure, and together with the specification, explain the methods, systems disclosed herein.

FIGS. 4A-4M illustrates various graphical user interfaces (GUIs) generated by a blockchain-based peer-to-peer transaction system, according to an embodiment.

DETAILED DESCRIPTION

Figure 1:
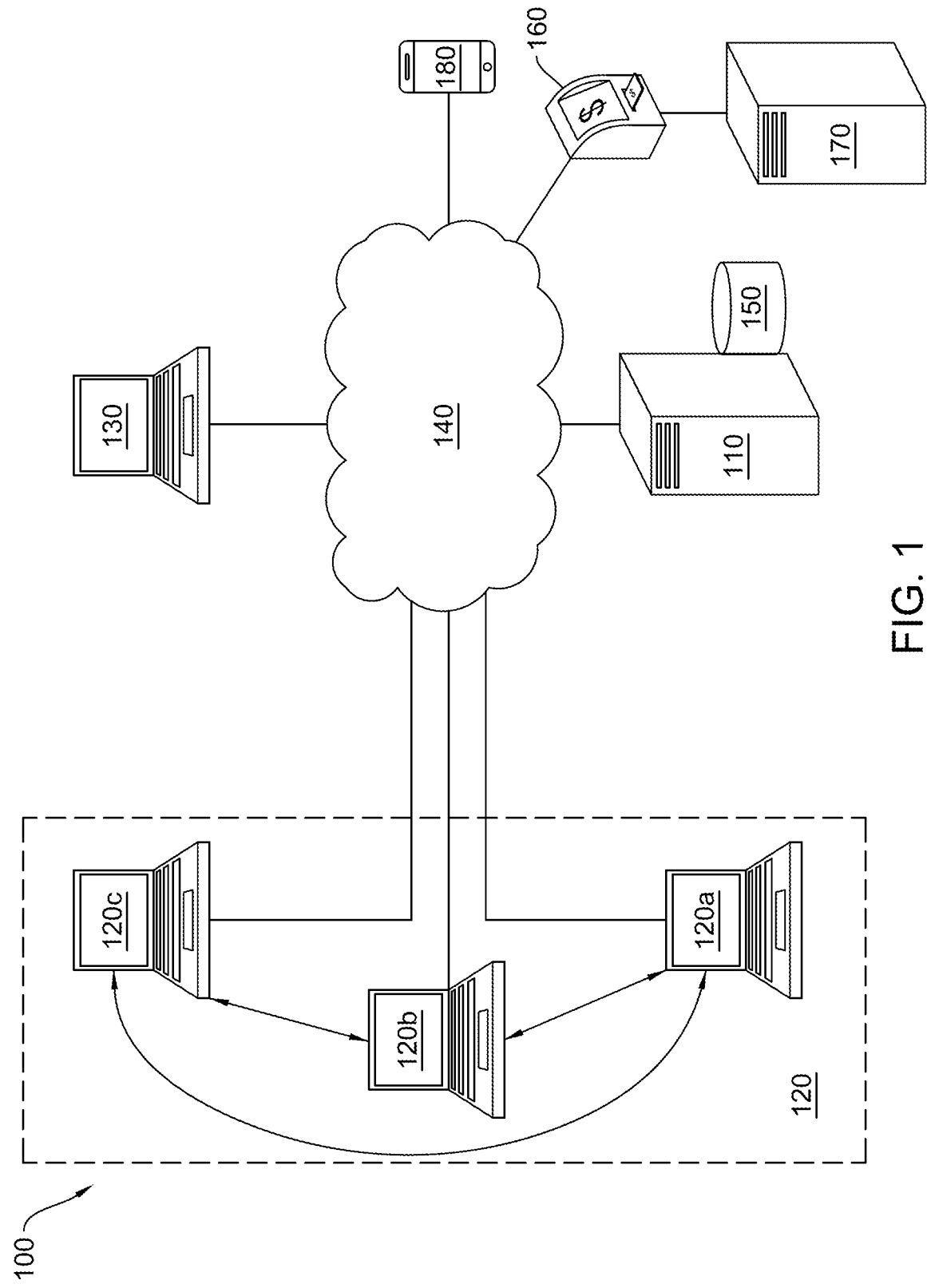
FIG. 1 illustrates an example of a computer system for facilitating blockchain-based peer-to-peer transactions, according to an embodiment.

Reference will now be made to the embodiments illustrated in the drawings, and specific language will be used here to describe the same. It will nevertheless be understood that no limitation of the scope of the methods/systems is thereby intended. Alterations and further modifications of the inventive features illustrated here, and additional applications of the principles of the methods/systems described herein as illustrated here, which would occur to a person skilled in the relevant art and having possession of this disclosure, are to be considered within the scope of the methods and systems described herein.

FIG. 1 illustrates components of a system 100 for facilitating blockchain-based peer-to-peer transactions, according to an embodiment. The system 100 may comprise an analytics server 110, a plurality of peer nodes 120a-c, computing device 130, a network 140, a system database 150, an electronic terminal 160 and its host server 170, and a recipient device 180. Aspects of the system 100 may be configured to employ and manage one or more system blockchains. Various features of the system 100 may be connected using a network, such as a network 140. Network 140 may be any synchronous or asynchronous network.

A system blockchain may sometimes be referred to as a "distributed ledger," and may include blockchain-based distributed ledger software (e.g., Hyperledger, Ethereum, Openchain, and TerraLedger). The system blockchain may operate as a distributed database that stores data records associated with users and transaction information, where the data records stored on the system blockchain may be blocks of data (e.g., block instances or blocks) that are hosted (e.g., locally stored or otherwise in possession of each analytics server 110 and/or each peer node 120a-c, such as being remotely hosted or hosted in a cloud) on analytics server 110 and/or peer nodes 120a-c. The analytics server 110 may store the same or similar records as the peer nodes 120a-c. For example, each of the peer nodes 120a-c may host a ledger of a distributed ledger that is maintained by peer nodes 120a-c. The analytics server 110 may host a ledger of a distributed ledger that corresponds (e.g., has similar data) to the distributed ledger of the peer nodes 120a-c. The analytics server 110 may generate duplicates of one or more block instances within a ledger of an analytics server 110 and store said block instances in the system database 150.

In some embodiments, the system blockchain may include all user information (e.g., transaction and virtual currency information of the members of the platform hosted by the analytics server 110). For instance, the information may be hosted on a blockchain having per nodes 120a-c. Therefore, the peer nodes 120a-c may refer to the computing devices of the members. The system blockchain may also refer to a private blockchain hosted and maintained by the analytics server 110.

The analytics server 110 may generate and display a user interface on the computing device 130 and/or the nodes of the peer nodes 120a-c. The analytics server 110 may be configurable administrative devices that analyze and maintain data of transactions between peer nodes 120a-c. The analytics server 110 may host a website accessible to end-users such as peer nodes 120a-c and/or computing device 130. The website is sometimes referred to herein as the platform or the electronic platform. The analytics server 110 may be any computing device comprising a processor and non-transitory machine-readable storage capable of executing the various tasks and processes described herein. Non-limiting examples of such computing devices may include workstation computers, laptop computers, server computers, laptop computers, and the like. Further and as described above, each of the analytics server 110 may be or include a server or multiple servers. Although three analytics server is shown, any number of analytics servers may be utilized.

The analytics server 110 may execute software applications configured to display the user interface (e.g., host a website), which may generate and serve various webpages to the computing device 130 and/or the peer nodes 120a-c. The webpages may be used to generate and access data stored on the system database 150 or a blockchain hosted or maintained by the peer nodes 120a-c and/or the analytics server 110. In some implementations, the analytics server 110 may be configured to require user authentication based upon a set of user authorization credentials (e.g., username, password, biometrics, cryptographic certificate, and the like). In such implementations, the analytics server 110 may access a system database 150 configured to store user credentials, which the analytics server 110 may be configured to reference to determine whether a set of entered credentials (purportedly authenticating the user) match an appropriate set of credentials that identify and authenticate the user.

A computing device 130 may be any computing device that allows a user to interact with the analytics server 110 via a webpage generated by the analytics server 110. The computing device 130 may execute an Internet browser or local application that accesses the analytics server 110 to issue requests or instructions to the analytics server 110 to access data of the system blockchain (e.g., transmit instructions to the analytics server 110). The computing device 130 may transmit credentials from user inputs to the analytics server 110. The analytics server 110 may authenticate the user and/or determine a user role based on their credentials.

The computing device 130 may comprise any number of input devices configured to receive any number of data inputs, including various types of data allowing for authentication (e.g., username, passwords, certificates, and biometrics). The computing device 130 may be any computing device comprising a processor and non-transitory machine-readable storage medium allowing the computing device 130 to perform the various tasks and processes described herein.

As an example of the computing device 130 operations, the computing device 130 may execute an Internet browser that accesses a web page hosted by the analytics server 110 hosting a transaction website (e.g., the platform). The transaction website may allow a user to upload a transaction request comprising a set of transaction attributes or otherwise input transaction attributes directly into the website. The transaction request may be a request to liquidate virtual assets stored onto the system blockchain using the electronic terminal 160 to a recipient operating the recipient device 180.

The computing device 130 may issue queries or instructions to the analytics server 110 via the webpages generated by the analytics server 110, which can cause the analytics server 110 to query the block instances on the peer nodes 120a-c, and, in some instances, perform various tasks, such as retrieving data from or transmitting data to the peer nodes 120a-c.

The analytics server 110 may generate and access blockchain instances that are hosted on peer nodes 120a-c, according to instructions received from the computing device 130, and/or any of the nodes of the peer nodes 120a-c. Software executed by the analytics server 110 may provide blockchain services to users interacting with the analytics server 110. For example, the analytics server 110 may provide blockchain services to the peer nodes 120a-c or the computing device 130 via the user interface provided to (e.g., displayed on) these computing devices. The analytics server 110 may update and query records in the system database 150 according to instructions they receive from the peer nodes 120a-c or the computing device 130. The analytics server 110 may then generate block instances for the system blockchain maintained by the peer nodes 120a-c, where the block instances contain data from transaction requests of the system database 150 and/or transaction records received from any of the peer nodes 120a-c. The analytics server 110 may transmit instructions to the peer nodes 120a-c to update local instances of the system blockchain maintained by the peer nodes 120a-c with a block instance that corresponds to the respective transaction.

The system database 150 can be a dynamic database that includes transaction records that the system database 150 receives from the peer nodes 120a-c and various other sources (e.g., data source providers). The system database 150 can be a graph database, MySQL, Oracle, Microsoft SQL, PostgreSQL, DB2, document store, search engine, key-value store, etc. The system database 150 may be configured to hold any amount of data and can be made up of any number of components. Transaction records stored in the system database 150 may comprise one or more data fields (e.g., attributes and/or attribute values) containing transaction-identifying hash values generated by the analytics server 110 according to a hashing algorithm implemented by the analytics server 110 and/or the peer nodes 120a-c.

When a new transaction request containing a machine-readable computer file (e.g., PDF, DOC, XSL), is received, the analytics server 110 may store the new transaction request in the system database 150. The analytics server 110 may also generate a hash value for the new transaction request and store the hash value in the system database 150. The hash value may be a unique identifier for the particular transaction and may be used by various computing devices of the system 100, such as the system database 150, to reference the computer file or metadata describing the computer file. The computer file may be stored in the system database 150 and/or on a block instance of the system blockchain that is hosted on peer nodes 120a-c or the system blockchain that is hosted on analytics server 110.

The system database 150 may be hosted on any number of computing devices comprising a non-transitory machine-readable storage medium and may be capable of performing the various tasks described herein. The system database 150 may be accessed by the analytics server 110 via a network.

The analytics server 110 may generate new block instances with timestamps or other data that links the new block instances with existing block instances on the blockchain. As an example, when the analytics server 110 generates a new transaction record in the system database 150 (after receiving a new transaction request and facilitating the transaction), the analytics server 110 may generate a hash value for the transaction based upon one or more attributes (e.g., terms) of the transaction. The analytics server 110 may then instruct the system blockchain to append the newly generated block instance. The analytics server 110 may transmit the new block instance (or data of the new block instance) to one or more of the peer nodes 120a-c. The peer nodes 120a-c, in turn, may append the newly generated block instance to the existing blockchain stored at the respective peer node 120a-c.

In some instances, to maintain the privacy of the attributes of a transaction between peer nodes 120a-c, the analytics server 110 may only transmit a hash or some other identifier of the data of a transaction to the peer nodes 120a-c. Each of the peer nodes 120a-c may receive the hash or identifier and generate a block instance to append to their respective blockchain based on the hash (and a hash of the immediately previous blockchain to create a link). Consequently, the peer nodes 120a-c may not receive information about a private transaction between peer nodes from the analytics server 110 and such data may not be stored on the blockchain that is maintained by the peer nodes 120a-c. The peer nodes 120a-c associated with the transaction may store the attributes of the transaction in a local database, enabling such peer nodes 120a-c to access such attributes without the attributes being publicly available on the system blockchain of the peer nodes 120a-c.

The analytics server 110 or peer nodes 120a-c may generate block addresses for data to be retrieved from blockchain instances of the system blockchain of the analytics server 110 and/or the peer nodes 120a-c. To do so, the analytics server 110 or peer nodes 120a-c may generate a hash value for a transaction, where the application uses the hash value or other identifier values as a block address to reference the file from the respective blockchain. The analytics server 110 or peer nodes 120a-c may generate the hash value for the transaction by generating a hash based on the transaction data (e.g., based on all or a portion of the data associated with a transaction) and the data of the immediately preceding block data or block address. This block address may then be stored into the system database 150 in a document record along with the transaction data and any number of additional data field entries related to the transaction.

In operation, the analytics server 110 or peer nodes 120a-c may reference the blocks of their respective blockchains containing a file for a transaction according to the block address of the file. The analytics server 110 may generate any number of block addresses similarly. Block addresses may be generated in any number of combinations of hashed block data and/or hashed block addresses from the new block and one or more preceding blocks, such that the address of the new block is dependent upon, or otherwise linked to, at least the immediately preceding block.

Peer nodes 120a-c may represent one or more members of the platform hosted by the analytics server 110. Peer nodes 120a-c may represent any group of computing devices (e.g., any group of computing devices that perform transactions with each other and maintain a blockchain for such transactions). Peer nodes 120a-c may or may not be a part of analytics server 110. A peer node 120a-c may be any computing device comprising a processor and a non-transitory machine-readable storage medium capable of performing the various tasks and processes described herein. Non-limiting examples of a peer node may be a workstation computer, laptop computer, tablet computer, and server computer.

Although three peer nodes are shown, any number of peer nodes may be utilized. Although the peer nodes 120a-c are described as storing blocks of the blockchain in FIG. 1, other computing devices, such as an analytics server 110, may host blocks of the blockchain or host a corresponding blockchain. Each peer node 120a-c may locally store an instance of the system blockchain in the storage medium of the system blockchain, and may further execute a software application that instructs the peer node 120*a-c* on generating and querying blocks within the locally stored blockchain instance. The analytics server 110 may be a peer node 120*a-c* or vice versa.

In operation, a peer node 120*a-c* may generate new block instances on a locally stored instance of the system blockchain maintained by the peer nodes 120*a-c* according to data received from an analytics server 110 or other peer nodes 120*a-c*. In some instances, the analytics server 110 may generate a new local block instance stored on the analytics server 110 (e.g., within the system database 150), and then instruct one or more of the peer nodes 120*a-c* to update the blockchain stored in their local storage (e.g., local database). Moreover, the analytics server 110 may query the block instances of the system blockchain of the peer nodes 120*a-c* according to a block address stored in the system database 150. When the analytics server 110 executes the query of the blocks on the system blockchain, the analytics server 110 may poll the peer nodes 120*a-c* to determine the most recent data on the system blockchain (e.g., latest valid blockchain).

The analytics server 110 may ensure that the data at a block of the system blockchain of the peer nodes 120*a-c* is accurate by using a voting mechanism encoded within the blockchain software executed by the analytics server 110 and/or the peer nodes 120*a-c*. Each peer node 120*a-c* may receive, from the analytics server 110 or the other peer nodes 120*a-c* a query for a block instance and a block address and return a response to the analytics server 110 and/or the peer nodes 120*a-c* indicating whether the block address contains the data that matches data of a corresponding block instance of a quorum (e.g., a majority or a predetermined percentage) of the peer nodes 120*a-c*. Responsive to a determination that the data matches a quorum, the analytics server 110 and/or the peer nodes 120*a-c* may append the block instance to the blockchain that they maintain.

The analytics server 110 and/or the peer nodes 120*a-c* may select this method to combat possible fraud and to be certain that data in the blockchain that they maintain is resistant to corruption, as each block instance on each and/or the peer nodes 120*a-c* would need to be corrupted in the same way for a possible security breach. In this way, the analytics server 110 and/or the peer nodes 120*a-c* may also be prevented from acting on obsolete data. For instance, a peer node 120*a-c* may attempt to modify information about a transaction with another peer node 120*a-c*. By modifying the information within the block instance, the hash value of said block instance may change, which would result in the block instance being disconnected from other block instances within the blockchain.

Furthermore, when queried by the analytics server 110 and/or the peer nodes 120*a-c*, other peer nodes 120*a-c* may indicate that the modified block instance does not match a version of the data stored on their respective nodes. As a result, the analytics server 110 and/or the peer nodes 120*a-c* may determine that the modified block instance has been indeed been tampered with. The analytics server 110 and/or the peer nodes 120*a-c* may then refuse to use the modified block instance. The analytics server 110 may implement a similar voting mechanism to append block instances to the system blockchain of the analytics server 110.

The peer nodes 120 *a-c* may encrypt the data to prevent others within the system 100 from accessing the data of a transaction. To generate the private block instances, depending on their configuration, the peer nodes 120*a-c* may encrypt or generate a hash of the data or a portion of the data of the transaction. The peer nodes 120*a-c* may encrypt the data with a symmetric key or a public key to which only the encrypting peer node 120*a-c* that has the corresponding key (symmetric key or private key) may decrypt the encrypted data. The peer nodes 120*a-c* may each maintain a copy of the transaction they generated in a local database to maintain a copy of the attributes of the transaction. The local database may be inaccessible (e.g., maintained in a secure environment) to other peer nodes 120*a-c* to keep the details of the transaction private.

Once the data of the transaction has been encrypted or hashed, the peer nodes 120*a-c* of the transaction may append a block instance containing the encrypted or hashed data (and any decrypted transaction data) to a local instance of the blockchain and propagate the data used to generate the block instance or an instance of the block instance itself to the other peer nodes 120*a-c*. Each peer node 120*a-c* may receive the data or the block instance and append a corresponding block instance to their respective local instance of the blockchain. Consequently, the peer nodes 120*a-c* may maintain the privacy of the attributes of transactions that they perform with each other while maintaining the integrity of the transactions for which they generate block instances.

When communicating about a pending transaction, the peer nodes 120*a-c* of the transaction may communicate through a private channel that is not accessible to the peer nodes 120*a-c* that are not privy to the transaction. The peer nodes 120*a-c* of the transaction may gain access to the private channel by being authenticated and authorized by another computing device, such as by the analytics server 110. In some embodiments, the communication between the peer nodes 120*a-c* of a private channel may be encrypted so outside computing devices such as other peer nodes 120*a-c* may not access or eavesdrop on such communication. There may be private channels between each permutation of the peer nodes 120*a-c*.

The system blockchain that is maintained by the peer nodes 120*a-c* may comprise regulation block instances. Regulation block instances may be block instances that include rules and/or thresholds for transactions that are individually associated with one or more of the peer nodes 120*a-c*. For example, a regulation block for a peer node 120*a-c* may have various anti-money laundering rules or other rules implemented by the analytics server 110. Such regulation blocks may only contain such rules and regulations as its data in addition to any hashes that link the regulation block with other blocks of the blockchains. Regulation blocks may be linked to other regulation blocks or transaction blocks.

The system 100 may also include an electronic terminal 160, which is connected to the analytics server 110*b*. The electronic terminal 160 is any electronic terminal configured to dispense cash, such as an automated teller machine or a cash machine. In some configurations, the electronic terminal 160 may be connected (e.g., hosted) by an independent server, such as the host server 170. In some configurations, the electronic terminal 160 may be hosted by the analytics server 110*b* itself. Even though system 100 illustrates a single electronic terminal, in some configurations, the analytics server may be in communication with multiple electronic terminals, each of which is configured to collect recipient data (e.g., unique transaction token) and dispense the transaction amount in a fiat currency.

The system 100 may also include recipient device 180. The recipient device 180 may be any computing device comprising a processor and non-transitory machine-readable storage capable of executing the various tasks and processes described herein. Non-limiting examples of such computing devices may include workstation computers, laptop computers, server computers, laptop computers, and the like. In some embodiments, the recipient device 180 may be a mobile phone operated by the recipient.

In operation, the analytics server may receive a transaction request from a user (member of the platform) operating the computing device 130. The transaction request may or may not include identification of the recipient device 180. The transaction request may include an instruction to liquidate an amount of virtual currency equivalent to a transaction amount inputted by a user operating the computing device 130. For instance, the transaction may include an instruction to liquidate the user's virtual currency account by an amount equivalent to $100. The analytics server 110 may first identify one or more accounts associated with the user. For instance, the analytics server 110 may query the system blockchain (stored onto the nodes 120a-c). The analytics server 110 may then identify whether the user's accounts can satisfy the transaction request. If the account has an account balance that can satisfy the transaction request, the analytics server 110 may generate a unique transaction token for the transaction.

The analytics server 110 may then transmit the unique transaction token to the host server 170 and/or the electronic terminal 160. The analytics server 110 may then transmit the unique transaction token to the computing device 130 and/or the recipient device 180 along with an identification (e.g., address) of the electronic terminal 160. The recipient may then interact with a user interface of the electronic terminal 160 and input the unique transaction code whereby the electronic terminal 160 may dispense the transaction amount. Upon receiving an indication that the transaction was completed (e.g., cash was dispensed), the analytics server 110 may instruct the system blockchain to append a new block instance indicating the transaction and debiting the user's account accordingly.

Figure 2:
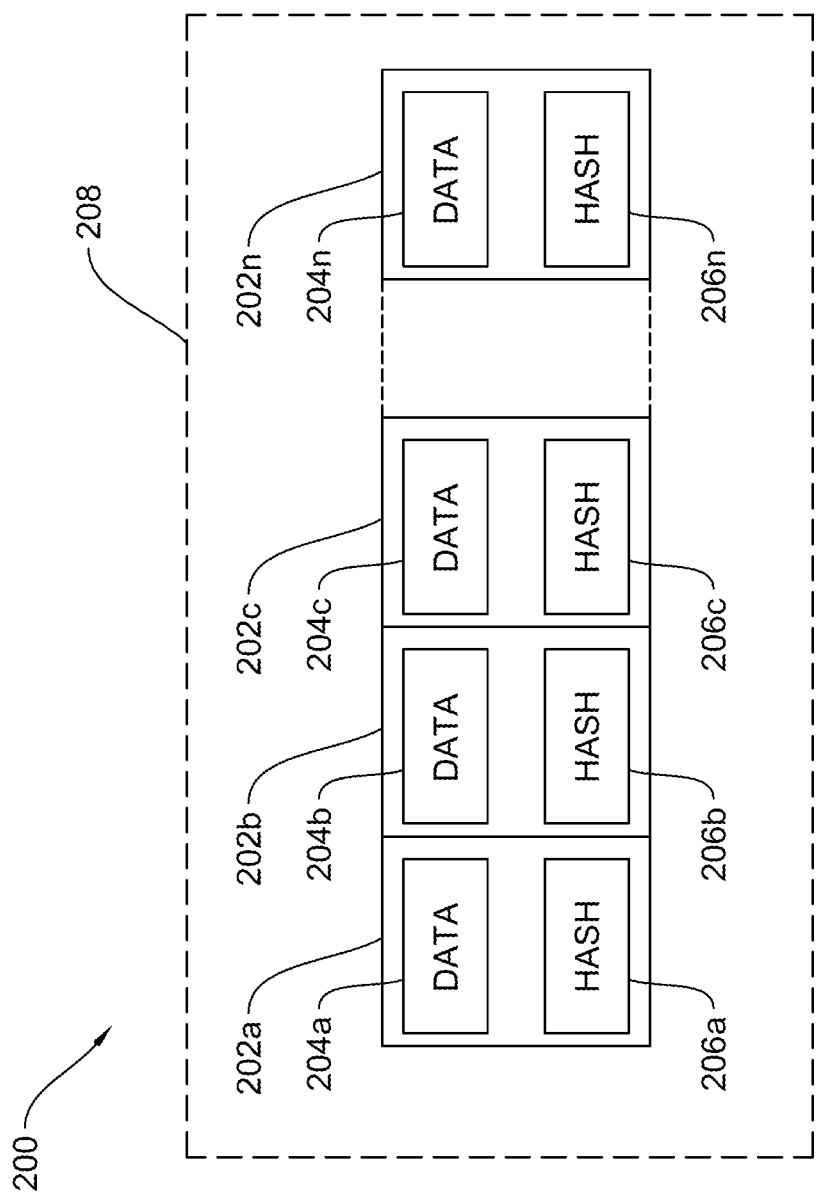
FIG. 2 graphically illustrates an example of appending multiple block instances to a blockchain, according to an embodiment.

Referring now to FIG. 2, an example of a system blockchain comprising different block instances for different users is illustrated. As depicted in FIG. 2, a blockchain 208 comprising block instances 202a-202n (collectively 202) may include data 204a-204n (collectively 204) that enables information, such as transaction data (e.g., transaction attributes and values), machine-readable code/documents, and other metadata associated with one or more transactions of the peer nodes described above. The block instances 202 may also contain hash values 206a-206n (collectively 206) that are used to link each of the block instances to the preceding block instance, as understood in the art.

The analytics server and/or peer nodes may generate (or instruct a blockchain service to generate) the block instance 202a. The analytics server may receive data 204a from a first peer node or a first computing device via a GUI provided by the analytics server on the first computing device or peer node. For instance, block instance 202a may include account data (e.g., account balance) of a first user of the platform provided by the analytics server. Using various methods described herein, the analytics server may generate the hash 206a.

The analytics server may also append (or transmit instructions to the peer nodes to generate and append) a block instance to the blockchain that the peer nodes maintain by identifying a quorum and as described herein. Upon generation of the block instance 202b, the analytics server may generate the hash value 206b based on the data 204b (and/or data of the immediately previous block instance), an identifier of the user computing device, other identifier information (e.g., time stamp and/or geolocation), and/or a reference to the system database associated with the analytics server.

For example, a user (e.g., the first user) may log into a website hosted or otherwise associated/managed by the analytics server and transmit data 204b (e.g., transaction data) to the analytics server. The analytics server may facilitate the transaction as described herein. Responsive to determining that the transaction was completed, the analytics server may append the block instance 204b to the blockchain 208.

The analytics server or peer nodes may also generate (or instruct a blockchain service to generate) the block instance 202c. The analytics server or peer nodes may receive data 204c from a second user's computing device that indicates another transaction. For example, a second user using the second computing device may log into a website hosted or otherwise managed by the analytics server and request a transaction (e.g., transaction data 204c). The analytics server or peer nodes may generate a hash value 206c based on the data 204c, an identifier of the second peer node, other identifier information (e.g., time stamp and/or geolocation), and/or a reference to the system database associated with the analytics server.

The hash value 206c may be based on the hash value 206b and/or the data 204c. The analytics server may incorporate the hash value 206b into the hash value 206c to append the block instance 202c to the block instance 202b. The analytics server may subsequently poll all the peer nodes to ensure the highest integrity of the blockchain by appending the latest block instance to the latest valid blockchain instances (e.g., the last blockchain for which there was a quorum). Using this method, blockchain instances within the blockchain 208 may be appended to the preceding blockchain instance. The analytics server may generate block instances 202c-n using the same methods explained above to continuously update the blockchain 208. As depicted, block instances 202a, 202b, 202c, and 202n are connected because of synchronization of hash values 206a, 206b, 206c, and 206n.

In some configurations, additional information, such as an identifier associated with peer nodes adding or updating the data could also be included within the blockchain or incorporated into the hash value. As an example, if a peer node adds any data to the blockchain, an identifier associated with the computing device that contributed to creating the data may be included in the respective block. In some embodiments, the identifier may include a time stamp (e.g., data regarding the time of data modification or creation) and/or a geolocation (e.g., data regarding the location within which the data modification or creation has occurred or has a value based on the user's geo-location). The identifier may also be incorporated within the hash value and may be used by the analytics server as a part of the hashing algorithm. Such identification information may be used as a veracity scale factor that the information is true and accurate.

The analytics server may transmit the blockchain instances to all the peer nodes of the blockchain to preserve the integrity of the blockchain. For example, the analytics server may transmit the hash value 206c (e.g., the hash value generated for block instance 202c based on data 204c received from a third node) to the first node (e.g., the first computing device associated with the block instance 202a) and the second node (e.g., the second computing device associated with the block instance 202b). Consequently, when the nodes of the blockchain are polled, they will not verify the modified block.

Modification of data within a block instance may disconnect that block instance from the blockchain. The analytics server may use this method to combat possible fraud or unauthorized modification of the data within blockchain instances. For example, if the second administrator using the second computing device modifies data 204b within block instance 202b, the hash value 206b will also be modified. As explained above the hash value 206b may be based on (or at least partially based on) data 204b; therefore if data 204b is modified, the hash value 206b will also be modified. Modification of the data 204b or the hash value 206c may break the link between block instance 202b and block instance 202c because hash value 206c is at least in part generated based on hash value 206b.

The depicted blockchain 208 corresponds to a system blockchain that includes data associated with all (or a portion of) members of the platform hosted by the analytics server. For instance, block instance 202a may include account data associated with a first user, and the block instance 202b may correspond to a transaction associated with the first user. Therefore, the data 204a may indicate the account balance of the first user, and the data 204b may indicate an amount to be debited (e.g., transaction amount) from the first user's account. In contrast, the block instance 202c may belong to a second user where the data 204c indicates the second user's account balances. When users conduct transactions, the analytics server may update the system blockchain accordingly. For instance, if the second user sends $100 to a recipient, the analytics server may generate a new block instance to indicate that the second user's account must be debited by $100 (or an amount equivalent to $100 if the second user's account is a virtual currency account).

Updating the system blockchain may be performed synchronously or asynchronously. For instance, the analytics server may update the system blockchain in batches based on all transaction data received within a predetermined timeframe (e.g., end of the day or each week). Alternatively, the analytics server may update the system blockchain in real-time. Therefore, the payment (e.g., transfer of the currency to the recipient) may be debited from a collective account that includes all assets held by all (or a predetermined portion of) users. For instance, when the analytics server receives a payment request, the analytics server verifies that the corresponding account has a balance that can satisfy the transaction request. The analytics server then debits the collective account (for all users) and transmits the transaction amount to the recipient. The analytics server may then append a block instance to the system blockchain indicating the amount to be debited from the user's account. The analytics server may then (at a later time) debit the user's account (e.g., request funds from the user's bank account or withdraw an amount from the user's account to replace the amount debited from the collective account). Therefore, the transaction between the user and the recipient may be performed in real-time (or near real-time) because the analytics server may not need to perform blockchain activity, which requires heavy computing power or cause transaction delays.

Figure 3:
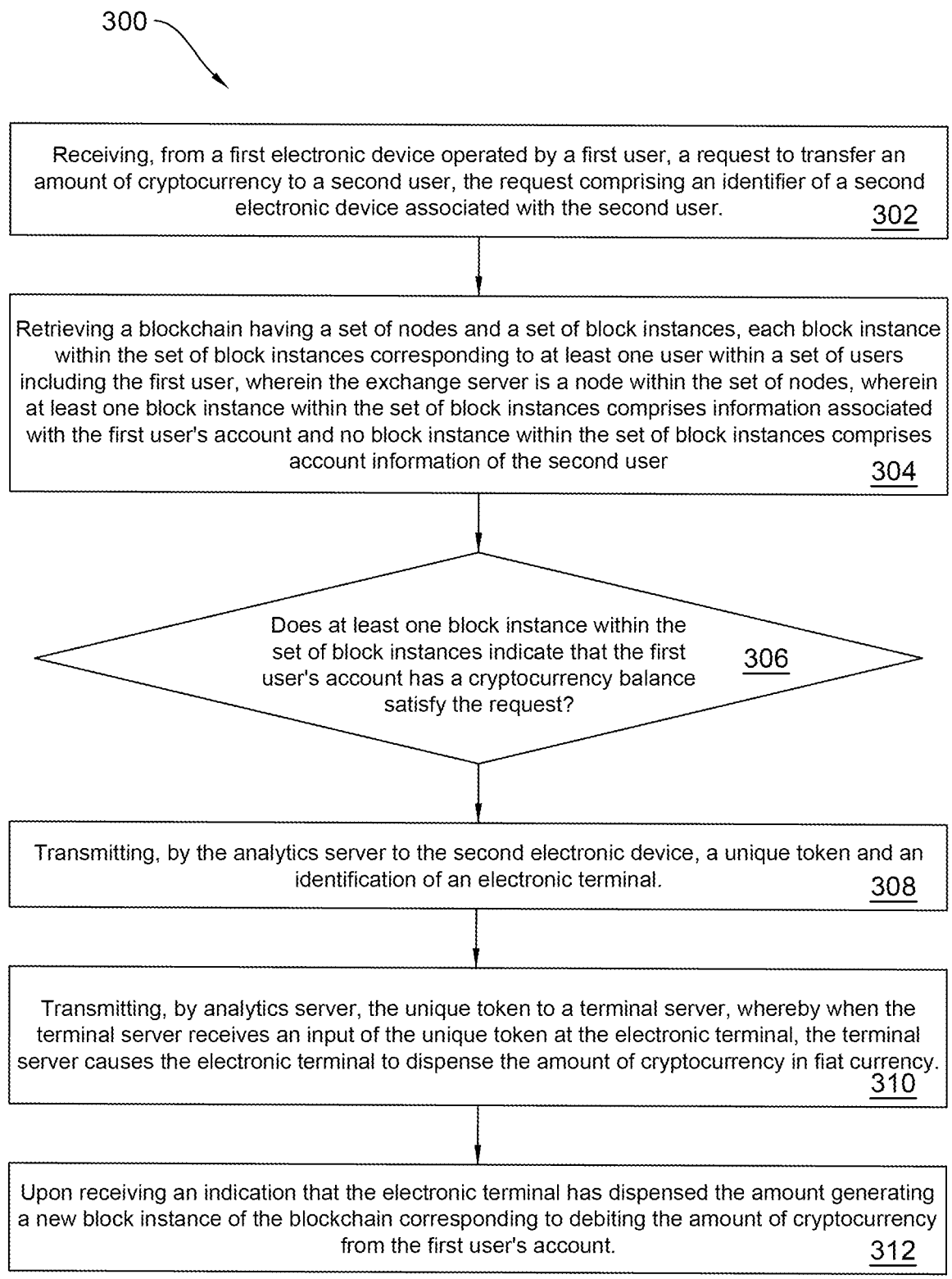
FIG. 3 illustrates a flowchart depicting operational steps for facilitating blockchain-based peer-to-peer transactions, according to an embodiment.

FIG. 3 illustrates execution of a method 300 for operational steps for facilitating blockchain-based peer-to-peer transactions, according to an embodiment. Other embodiments of executing a method 300 may comprise additional or alternative steps, or may omit some steps altogether. Each of the steps of method 300 may be performed by one or a combination of the analytics server, a first computing device, or any node within the system blockchain.

At step 302, the analytics server may receive, from a first electronic device operated by a first user, a request to transfer an amount of cryptocurrency to a second user, the request comprising an identifier of a second electronic device associated with the second user.

The analytics server may receive a transaction request from a first electronic device. The transaction request may indicate a user's desire to transmit money from one or more of his accounts accessible to the analytics server. The user operating the first electronic device may identify an origination account, a transaction amount (e.g., the amount of currency to be transferred, a currency for the transaction (e.g., the currency of the transaction amount received by the recipient), timeframe, and/or identification of a second electronic device associated (e.g., operated by) a second user. For instance, a first user operating the first electronic device may access a transaction/exchange platform generated and/or hosted by the analytics server. The first user may then instruct the analytics server to facilitate a transaction where money is debited from one or more of the first user's accounts. The first user may then identify one or more accounts and an amount of money to be transferred to a recipient (referred to herein as the transaction amount). The first user may view a list of his accounts associated with the analytics server and may select an originating account.

For instance, the user may select an account with virtual currency. As described herein, the analytics server may generate and host a system blockchain having a series of block instances where one or more block instances indicate an amount of virtual currency owned by each user. Using the methods and systems described herein, the analytics server may facilitate the liquidation of users' virtual currency and exchange of virtual currency to other currencies, e.g., US dollars.

The first user may also indicate a currency associated with the withdrawn transaction amount. For instance, the first user may indicate a desire that the money to be transferred must be withdrawn in US dollars or Euros.

In some embodiments, the first user may also identify a recipient. The user may indicate an identification of an electronic device operated by (or otherwise associated with) the recipient. For example, the first user may input a number of the recipient's mobile device. The methods and systems described herein do not require an identifier associated with the recipient. The analytics server may transmit money to an ATM using the methods and systems described herein without identifying a recipient. Therefore, an indication or an identifier of the recipient (second user) is not always required.

As used herein, the second user is the recipient who can use the methods and systems described herein to receive the transaction amount originating from an account identified by a first user operating the first electronic device. However, the methods and systems described herein can also be used by the first user to withdraw the transaction amount himself. For instance, as will be described below a user can use the methods and systems described herein to generate a unique transaction token and operate an automated teller machine (ATM) to withdraw the transaction amount himself Therefore, even though aspects of the embodiments described herein are described with regard to a second user and/or the recipient, it is expressly understood that the first user may also act as the second user.

At step 304, the analytics server may retrieve a blockchain having a set of nodes and a set of block instances, each block instance within the set of block instances corresponding to at least one user within a set of users including the first user, wherein the analytics server is a node within the set of nodes, wherein at least one block instance within the set of block instances comprises information associated with the first user's account and no block instance within the set of block instances comprises account information of the second user.

As described herein, the analytics server may host (or at least be a node associated with) a system blockchain identifying virtual assets associated with members of an exchange platform. The analytics server may retrieve a latest valid blockchain from one or more nodes associated with the system blockchain. For instance, the analytics server may query and retrieve a latest valid blockchain from a predetermined number (or a proportion) of the nodes associated with the system blockchain (e.g., block instances stored onto member's devices and/or other nodes). The analytics server may then analyze the received copies of the blockchain to identify the validity of the block instances associated with the first user. The first user may be a member of the platform and the analytics server may, upon receiving the request in step 302, retrieve a unique identifier of the first user (e.g., login name inputted by the first user, or a UUID associated with the electronic device of the first user). The analytics server may then use the retrieved identifier to search the system blockchain and to determine whether the user's account has a balance that could satisfy the first user's request.

As described above, the second user (recipient) may not a member of the exchange platform hosted by the analytics server. Therefore, the second user's information may not be included within the system blockchain.

At step 306, the analytics server determines if at least one block instance within the set of block instances indicating that the first user's account has a cryptocurrency balance satisfies the request. At step 308, the analytics server transmits, to the second electronic device, a unique token and an identification of an electronic terminal. At step 310, the analytics server, the unique token to a terminal server, whereby when the terminal server receives an input of the unique token at the electronic terminal, the terminal server causes the electronic terminal to dispense the amount of cryptocurrency in fiat currency.

As described herein, the analytics server may query one or more blockchains to determine whether the first user has an account balance that satisfies his request (e.g., account balance is more than the transaction amount). The analytics server may apply an exchange rate to determine whether the virtual currency can satisfy the transaction amount (e.g., an exchange rate to calculate a value of the first user's virtual currency in the currency identified as the transaction currency). The blockchain may be a private blockchain that is maintained by the analytics server, another third party server under the direction of the analytics server, and/or a set of nodes in communication with the analytics server.

When the analytics server identifies that the first user has at least one account that can satisfy the transaction amount, the analytics server may generate a unique transaction token for the transaction. The unique transaction code may be a series of alphanumerical values that are randomly generated and is unique to the first user's transaction request. The analytics server may use a variety of methods to generate this unique code. Non-limiting examples of a unique transaction token may include a pin code having numbers, a passcode having letters, or a passcode having numbers, letters, and other characters. In some embodiments, the unique transaction token may be a visual element (e.g., QR code) that can be scanned by one or more electronic terminals.

The analytics server may then transmit the unique transaction token to one or more electronic devices in accordance with the transaction request received in step 302. For instance, if the transaction request includes a recipient identifier, the analytics server may transmit the unique transaction token to the recipient identifier (e.g., recipient's phone number) and/or the electronic device associated with the first user (sender). If the transaction request does not include a recipient identifier, the analytics server may only display (or otherwise transmit, such as by sending a notification or a message) the unique transaction token onto the first user's electronic device. In those embodiments, the first user may transmit the unique transaction token to the second user (recipient) or may use the unique transaction token himself to receive the payment using an electronic terminal.

The analytics server may also transmit the unique transaction code to one or more electronic terminals and/or one or more servers hosting one or more electronic terminals. The analytics server may identify one or more participating electronic terminal that is configured to dispense currency upon receiving instructions (directly or indirectly) received from the analytics server. In some embodiments, the analytics server may query a predetermined data table that includes a list of participating electronic terminals. As described above, the electronic terminal may be any electronic device configured to dispense a predetermined amount of currency, such as an ATM. The analytics server may also transmit the transaction requests received in step 302 to the one or more electronic terminals and/or one or more servers hosting the one or more participating electronic terminals.

The analytics server may identify a list of participating electronic terminals. The analytics server may use the first user's location (or another location inputted or otherwise indicated by the first user in the transaction request) to identify a list of electronic terminals within a predetermined proximity. The analytics server may then filter the identified list using one or more attributes. For instance, the analytics server may first identify a list of electronic terminals previously registered with the analytics server that are capable of receiving the unique transaction token (and other communication) from the analytics server. The analytics server may then further filter the list of electronic terminals based on predetermined attributes (e.g., hosting server entity or handicap-enabled) or attributes received from the transaction request (e.g., electronic terminals that are capable of dispensing the transaction currency).

The analytics server may transmit the list of participating/appropriate electronic terminals to the first and/or the second users. For instance, the analytics server may transmit a message (e.g., text message or push notification) that includes an identifier (e.g., address or a visual map) of the list of participating electronics terminals.

The analytics server may transmit various instructions in conjunction with the unique transaction token causing the host server and/or the electronic terminal to dispense the transaction amount. For instance, the instructions may include the first user's identification information, the time duration of the transaction (e.g., a timeframe in which the unique transaction code can be used), the currency to be dispensed, and the like.

The recipient (e.g., first or second user) may interact with the user interface of one of the electronic terminals indicated within the message received from the analytics server and may input the unique transaction token (e.g., input the PIN or scan the visual code received). As a result, the electronic terminal dispenses the transaction amount. The electronic terminal may also transmit an instruction to the analytics server indicating that the transaction was completed and the transaction amount was dispensed.

At step 312, the analytics server may, upon receiving an indication that the electronic terminal has dispensed the amount, generate a new block instance of the blockchain corresponding to debiting the amount of cryptocurrency from the first user's account. Upon a user (first and/or second user) entering the transaction code (or any other authentication necessary), the electronic terminal may dispense an amount of currency that corresponds to the transaction information, previously received from the analytics server in step 310.

The analytics server may update the system blockchain in accordance with the methods/systems described herein to reflect the transaction. For instance, the analytics server may generate a new block instance indicating that the first user has debited the transaction amount from one or more of his/her accounts. Using the methods and systems described herein, the analytics server may append the newly generated block instance to the system blockchain. As described above, the analytics server may update the system blockchain in real-time or in batches.

Referring now to FIGS. 4A-M, non-limiting examples of the graphical user interfaces described herein are illustrated. Even though FIGS. 4A-M illustrate a sequential order of graphical user interfaces, in some configurations the analytics server may display the depicted graphical user interfaces in another order. Moreover, the analytics server may not display one or more of the graphical user interfaces described herein altogether. The analytics server may display various combinations and configurations of the graphical user interfaces depicted herein.

The graphical user interfaces depicted in FIGS. 4A-M illustrate one or more graphical user interfaces displayed by the analytics server, as described in FIGS. 1-3. Therefore, the FIGS. 4A-M depict, at least partially, the user experience from the sender and receiver's perspective. The analytics server may display one or more of the GUIs depicted herein using "look and feel" of a third-party application/website, such that the users (e.g., sender and receiver) may or may not be aware that the analytics server has generated/hosted the GUIs depicted herein. As a result, a sender may not be required to leave the third-party application/website and/or initiate a new graphical user interface generated by the analytics server to transfer currency to a receiver.

The user experience starts with a sender user accessing and initiating an application generated hosted by the analytics server. For example, a user may log into an application hosted by the analytics server and executing on the user's mobile device. As will be described throughout, the user may desire to send money to a recipient who is not a member of services provided by the analytics server. For instance, the analytics server may not have account information associated with the recipient. While other payment systems and methods require the recipient to generate an account, the methods and systems described herein facilitate the requested transaction between the member user and the recipient without ever receiving any personally identifiable information associated with the recipient.

When the user initiates the application executing on his mobile device, the analytics server may first authenticate the user, such as was by requiring a login/password authentication or any other authentication methods. Upon successful authentication, the analytics server may display GUI 401, as depicted in FIG. 4A. GUI 401 may include graphical component 414 that displays the user's account information. The analytics server may query various accounts associated with the user and may display updated account information of the user. For instance, as depicted in the graphical component 414, the user has a certain amount of virtual currency (e.g., depicted herein as Bitcoin however the methods and systems described herein also apply to any virtual currency or any other blockchain-based currency).

The analytics server may also display an amount (in a particular currency) that is equivalent to the user's virtual currency account (e.g., fiat currency). For instance, as depicted in graphical component 414, the analytics server applies a predetermined exchange rate to the user's virtual assets and may display the user's virtual assets in US Dollars and Euros.

When the user interacts with the interactive button 416, the analytics server displays GUI 402, as depicted in FIG. 4B. By interacting with the interactive button 416, the user indicates a desire to transfer money to a recipient. The GUI 402 includes graphical components configured to receive details of the desired transaction. The GUI 402 includes input elements allowing the user to choose an account, an amount, and the recipient. For instance, the user may interact with the interactive component 418 (e.g., drop-down menu). When the analytics server receives an indication that the user has interacted with the interactive component 418, the analytics server displays the GUI 403, as depicted in FIG. 4C.

The GUI 403 includes various interactive components and input elements allowing a user to choose a particular account. For instance, GUI 403 includes the graphical components 420 and 422. The graphical component 420 displays the user's virtual assets and displays similar information as previously displayed in the graphical component 414. In some configurations, the user may have linked multiple accounts, such that the analytics server has access to traditional non-blockchain-base currency as well. For instance, as depicted in the graphical component 422, the user has previously linked two bank accounts. The user may select an account for the desired transaction, whereby the analytics server debits (synchronously or asynchronously) the selected account to facilitate the transaction and transfer the desired amount (in the desired currency) to the recipient. When the user selects an account, the analytics server displays GUI 404, as depicted in FIG. 4D.

The analytics server may display an indicator 424 that corresponds to the account selected by the user. For instance, the indicator 424 indicates that the user has selected his virtual currency account to facilitate the transaction. When the user interacts with the interactive component 426, the analytics server displays the GUI 405, as depicted in FIG. 4E.

In the GUI 405, the analytics server provides various options to the user to select a method for the recipient receiving the transferred amount. For instance, the user may select another account (e.g., a secondary bank account, or cash from an ATM). When the user interacts with the graphical component 428, the analytics server may proceed to the GUI 406, depicted in FIG. 4F.

The GUI 406 displays a preview of the transaction to be reviewed and approved by the user. Specifically, the graphical component 430 displays that the user desires to send money to a recipient using his virtual currency account, the graphical component 432 indicates that the user desires the recipient to receive money in US dollars, and the graphical component 434 indicates that the user desires the recipient to receive the transaction amount at an ATM. The above-described graphical components 430 and 432 are also configured to receive input from the user. For instance, as depicted in GUI 407, depicted in FIG. 4G, the user can input numerical values associated with the transaction. For instance, the user inputs the amount of virtual currency to be liquidated and transferred to the recipient and the analytics server uses a predefined exchange rate (where the exchange rate sometimes includes a fee) to calculate an amount to be withdrawn (e.g., the amount to be received by the recipient).

The user may review and approve the transaction amount, currency, and other attributes. When the user approves the transaction, the analytics server proceeds to GUI 408, as depicted in FIG. 4H where the user can finalize the transaction by confirming the attributes of the transaction. Upon confirming the transaction, the analytics server may transmit an electronic message to one or more electronic devices associated with the user. For instance, as depicted in GUI 409 in FIG. 4I, the analytics server may send a text message to the user's mobile device. The text message, fully depicted in GUI 410 in FIG. 4J, may include transaction details and a unique passcode associated with the transaction (graphical component 438). The text message may also include a map associated with authorized ATMs where the user can use the unique passcode to receive the transaction amount (e.g., map 440).

Figure 4K:
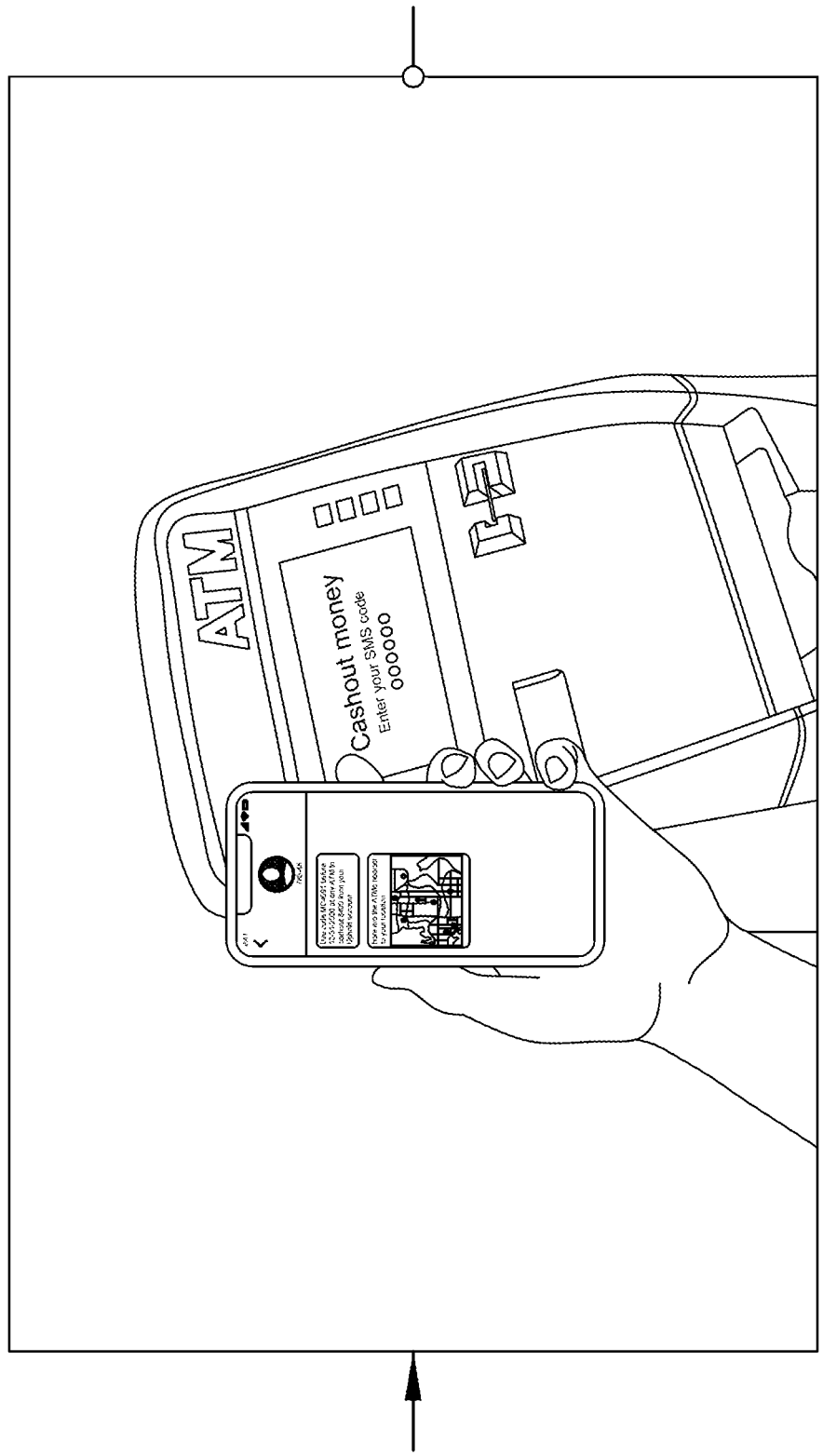

As described herein, the user may share the passcode and/or identification of the ATMs with the recipient. In some configurations, the user may use the passcode himself to receive a transaction amount in a defined currency (e.g., US Dollars) in exchange for his virtual assets. As described herein, the analytics server may also communicate with one or more servers associated with the identified ATMs. Specifically, the analytics server may transmit the unique passcode to one or more servers hosting or otherwise operating the identified ATMs. When the user (or anybody else) enters the unique passcode, the user can receive the transaction amount in the identified currency (as illustrated in FIG. 4K).

Upon the user or the recipient inputting the unique passcode into the user interface of an ATM identified within the map 440, the analytics server may transmit a confirmation text message to one or more electronic devices associated with the user and/or the transaction. For instance, as depicted in GUI 411 in FIG. 4L, the analytics server may transmit the text message 442 to the user's mobile device, which may include a confirmation of the transaction (including the amount of transaction and the ATM used to receive the transaction amount), as depicted in FIG. 4M (component 444).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods, systems, and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate the transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
    receiving, by an analytics server from a first electronic device operated by a first user, a request to transfer an amount of cryptocurrency to a second user, the request comprising an identifier of the second user and a timeframe for transferring the amount of cryptocurrency;
    retrieving, by the analytics server from at least one of a set of nodes, a private blockchain having a set of block instances, each block instance within the set of block instances corresponding to at least one user within a set of users including the first user,
        wherein the analytics server is a node within the set of nodes,
        wherein at least one block instance within the set of block instances comprises information associated with a first user's account, and no block instance within the set of block instances comprises account information or the identifier of the second user;
    upon at least one block instance within the set of block instances indicating that the first user's account has a cryptocurrency balance that satisfies the request:
        transmitting, by the analytics server to the first electronic device, an identification of an electronic terminal;
        transmitting, by the analytics server, a unique token to a second electronic device of the second user, the unique token comprising a QR code unique to the request to transfer the amount of cryptocurrency; and
        causing, by the analytics server, the electronic terminal to dispense the amount of cryptocurrency in fiat currency upon the electronic terminal scanning the QR code of the unique token within the timeframe, via transmission of instructions in conjunction with the unique token and the timeframe to a terminal server in communication with the electronic terminal; and
    upon receiving an indication that the electronic terminal has dispensed the fiat currency, generating, by the analytics server, a new private block instance of the private blockchain corresponding to debiting the amount of cryptocurrency from the first user's account, wherein generating the new private block instance comprises:
        hashing data representing the amount of cryptocurrency debited from the first user's account to satisfy the request to transfer the amount of cryptocurrency,
        appending the new private block instance including the hashed data to a local instance of the private blockchain, and
        communicating the hashed data used to generate the new private block instance to the set of nodes,
    wherein each node of the set of nodes appends a corresponding block instance to their respective local instance of the private blockchain.

2. The method of claim 1, wherein the identification of the electronic terminal corresponds to a location of the electronic terminal on a map.

3. The method of claim 1, wherein the analytics server updates the private blockchain in real-time.

4. The method of claim 1, wherein the analytics server updates the private blockchain in batches using a predefined timeframe.

5. The method of claim 1, wherein the first electronic device is a node within the set of nodes.

6. The method of claim 1, wherein the analytics server debits the amount of cryptocurrency from a collective account associated with the first user and other users associated with the analytics server.

7. The method of claim 1, wherein the analytics server receives an indication of an origination account of the fiat currency from the first electronic device.

8. A system comprising:
    an analytics server comprising a processor and a non-transitory computer-readable medium containing instructions that when executed by the processor causes the processor to perform operations comprising:
        receive, from a first electronic device operated by a first user, a request to transfer an amount of cryptocurrency to a second user, the request comprising an identifier of the second user and a timeframe for transferring the amount of cryptocurrency;
        retrieve, from at least one of a set of nodes, a private blockchain having a set of block instances, each block instance within the set of block instances corresponding to at least one user within a set of users including the first user,
            wherein the analytics server is a node within the set of nodes,
            wherein at least one block instance within the set of block instances comprises information associated with a first user's account and no block instance within the set of block instances comprises account information or the identifier of the second user;
        upon at least one block instance within the set of block instances indicating that the first user's account has a cryptocurrency balance that satisfies the request:
            transmit, to the first electronic device, an identification of an electronic terminal;
            transmit a unique token to a second electronic device of the second user, the unique token comprising a QR code unique to the request to transfer the amount of cryptocurrency; and
            cause the electronic terminal to dispense the amount of cryptocurrency in fiat currency upon the electronic terminal scanning the QR code within the timeframe, via transmission of instructions in conjunction with the unique token and the timeframe to a terminal server in communication with the electronic terminal; and
        upon receiving an indication that the electronic terminal has dispensed the fiat generate a new private block instance of the private blockchain corresponding to debiting the amount of cryptocurrency from the first user's account, wherein generating the new private block instance comprises:

hash data representing the amount of cryptocurrency debited from the first user's account as satisfying the request to transfer the amount of cryptocurrency, append the new private block instance including the hashed data to a local instance of the private blockchain, and communicate the hashed data used to generate the new private block instance to the set of nodes, wherein each node of the set of nodes appends a corresponding block instance to their respective local instance of the private blockchain.

9. The system of claim 8, wherein the identification of the electronic terminal corresponds to a location of the electronic terminal on a map.

10. The system of claim 8, wherein the analytics server updates the private blockchain in real-time.

11. The system of claim 8, wherein the analytics server updates the private blockchain in batches using a predefined timeframe.

12. The system of claim 8, wherein the first electronic device is a node within the set of nodes.

13. The system of claim 8, wherein the analytics server debits the amount of cryptocurrency from a collective account associated with the first user and other users associated with the analytics server.

14. The system of claim 8, wherein the analytics server receives an indication of an origination account of the fiat currency from the first electronic device.

\* \* \* \* \*